US006690357B1

(12) United States Patent
Dunton et al.

(10) Patent No.: US 6,690,357 B1
(45) Date of Patent: Feb. 10, 2004

(54) INPUT DEVICE USING SCANNING SENSORS

(75) Inventors: Randy R. Dunton, Phoenix, AZ (US); Thomas M. Charlesworth, Scottsdale, AZ (US); John W. Richardson, Portland, OR (US); Kelan C. Silvester, Portland, OR (US); Marion H. Shimoda, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/187,903

(22) Filed: Nov. 6, 1998

Related U.S. Application Data (63) Continuation-in-part of application No. 09/167,814, filed on Oct. 7, 1998.

(51) Int. Cl.[7] .................................................. G09G 5/08
(52) U.S. Cl. ....................................... 345/158; 345/157
(58) Field of Search ................................ 345/157, 158, 345/156, 1.2, 2.1, 87; 382/291, 168, 118, 181; 364/188; 358/453; 353/22, 69, 28

(56) References Cited

U.S. PATENT DOCUMENTS

| 5,148,155 A | * | 9/1992 | Martin et al. ................. 340/712 |
| 5,168,531 A | * | 12/1992 | Sigel ............................ 382/48 |
| 5,436,639 A | * | 7/1995 | Arai et al. .................... 345/156 |
| 5,454,043 A | * | 9/1995 | Freeman ....................... 382/168 |
| 5,528,263 A | * | 6/1996 | Platzker et al. .............. 345/156 |
| 5,617,312 A | * | 4/1997 | Iura et al. .................... 364/188 |
| 5,682,181 A | * | 10/1997 | Nguyen et al. .............. 345/158 |
| 5,767,842 A | * | 6/1998 | Korth ........................... 345/168 |
| 5,859,623 A | * | 1/1999 | Meyn et al. ..................... 345/1 |
| 5,864,334 A | * | 1/1999 | Sellers ......................... 345/168 |
| 5,936,610 A | * | 8/1999 | Endo ............................ 345/157 |
| 6,043,805 A | * | 3/2000 | Hsieh .......................... 345/158 |
| 6,104,384 A | * | 8/2000 | Moon et al. .................. 345/168 |
| 6,431,711 B1 | * | 8/2002 | Pinhanez ...................... 353/69 |

FOREIGN PATENT DOCUMENTS

| DE | 196 12 949 C1 | 8/1997 |
| DE | 298 02 453 U1 | 6/1998 |
| EP | 0 554 492 A1 | 8/1993 |
| EP | 0 626 636 A2 | 11/1994 |
| EP | 0 829 799 A2 | 3/1998 |
| EP | 0 866 419 A2 | 9/1998 |

* cited by examiner

*Primary Examiner*—Vijay Shankar
(74) *Attorney, Agent, or Firm*—Trop, Pruner & Hu, P.C.

(57) ABSTRACT

An electronic device receives inputs using images of input devices and scanning sensors that detect user interaction with those images. For example, an image of a mouse may be projected and the user's interaction with that image may be scanned using digital video cameras. These user movement images may then be analyzed to determine, for example, the direction, extent and rate of movement of the user to provide pointer position command signals. Similarly the user's movement relative to a virtual keyboard image may be analyzed and converted into key actuation signals for responding to the actuated virtual keys.

9 Claims, 6 Drawing Sheets

INPUT DEVICE USING SCANNING SENSORS

This application is a continuation-in-part of application Ser. No. 09/167,814, filed on Oct. 7, 1998.

BACKGROUND

This invention relates generally to input devices for electronic devices including computer systems and particularly to such devices using video control inputs.

A variety of pointing devices have been used in computer systems to control the position of a pointer or cursor on a display. A pointer or cursor is an image that may be moved across the screen to select a particular option provided in the form of a physical depiction on a user interface. In this way, the user may interact with a video display to provide focus to particular tasks and activities offered through the user interface.

Known pointing devices include the mouse, track ball and the pointing stick. All of these devices generally involve an electromechanical interface which is prone to failure. When the interface fails, it may result in an incorrect signal which may cause movement of the pointing device to be incorrectly reflected in the pointer position of the display.

Another well known pointing device, the touch pad pointing device, allows the user to touch a contact surface. Movements of the user's finger on the contact surface are tracked as corresponding movements of the pointer on the computer display. Normally, touch pads have capacitive sensors which detect finger position and movement and translate that movement into position control signals.

The touch pad pointing devices are subject to being fouled by dirt or moisture, resulting in incorrect signals as described above. In addition the touch pad devices provide a limited degree of movement, making it difficult to learn to control the pointer using the limited movements available through the pointing devices.

A number of computer systems use keyboards for inputting text information to the computer. The keyboard is generally connected to the computer by a cable. Like the pointing device, the keyboard involves an electromechanical interface which is prone to failure. These failures may result in the inability of a particular key to activate a particular input. In any case, inputs which are provided to the keyboard may be inaccurately reflected in the text which appears on the display screen.

Thus, there is a need for an improved input device which allows the user to input information in ways which may be less prone to failure.

A number of electronic devices, including computer systems, include relatively bulky input devices such as keyboards. For example, in many portable computers such as laptop or notebook computers, a folding housing is used in which the display is essentially one portion of the overall housing and the keyboard is the other portion. Thus, a considerable portion of the overall bulk of the device is taken up by the keyboard. Similarly in some personal digital assistants (PDAs) or palm-sized computers, the keyboard or keypad input device takes up a considerable portion of the overall bulk of the device.

There is a demand for ever smaller computing devices. Portable computers such as laptop or notebook computers are progressively decreasing in size. Similarly there is increasing interest in palm-sized or PDA-type computer systems.

Thus, there is a continuing demand for new ways to reduce the size of electronic devices including computer systems.

SUMMARY

In accordance with one embodiment, a method for inputting data to an electronic device includes projecting an image on a surface. User movements are detected relative to the projected image.

DETAILED DESCRIPTION

Figure 1:
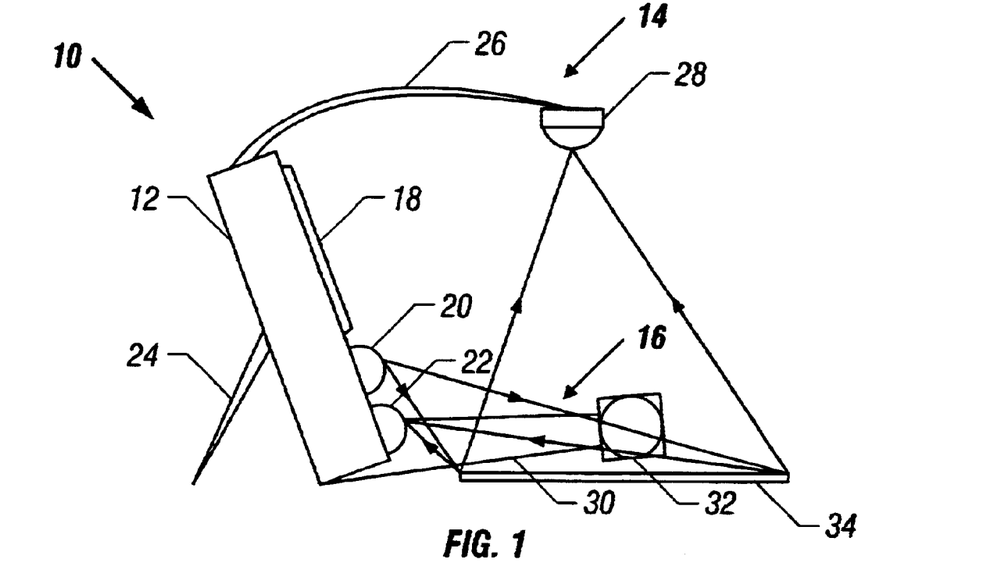
FIG. 1 is a side elevational view of one embodiment in accordance with the invention.
Figure 2:
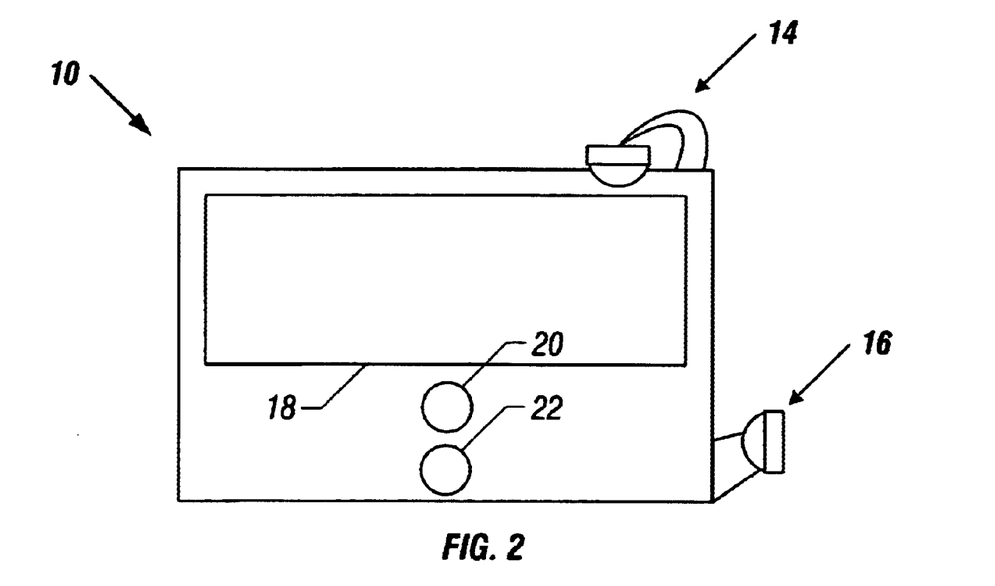
FIG. 2 is a front elevational view of the embodiment shown in FIG. 1.

An electronic device which may be implemented as the computer system 10, shown in FIG. 1, may include a housing 12 which includes a display 18. Unlike conventional computer systems, the system 10 may not have a keyboard or a pointing device. Scanning sensors 14 and 16 may be provided on extended arms 26 and 30 to enable scanning of the region in front of the housing 12. The scanning sensors 14 and 16 may, for example, be digital cameras that produce streaming video which is conducted through cables contained in the arms 26 and 30 to the housing 12. An additional scanning sensor 22 may be provided on the front face of the housing 12 beneath the display 18, as shown in FIG. 2.

Also situated on the housing 12 is a projector 20 that projects an image onto a surface, such as a desktop, situated in front of the housing 12. The projector 20 may for example, be a liquid crystal display (LCD) projector, a laser projector or a light engine projector such as a digital light processing (DLP) light engine from Texas Instruments, Inc. The region where the image is projected may be the same region which is scanned by the scanning sensors 14, 16 and 22. Each scanner may be aligned transversely to each of the other scanners for better three dimensional imaging. The housing 12 may be supported at an angled orientation by the stand 24.

Figure 3:
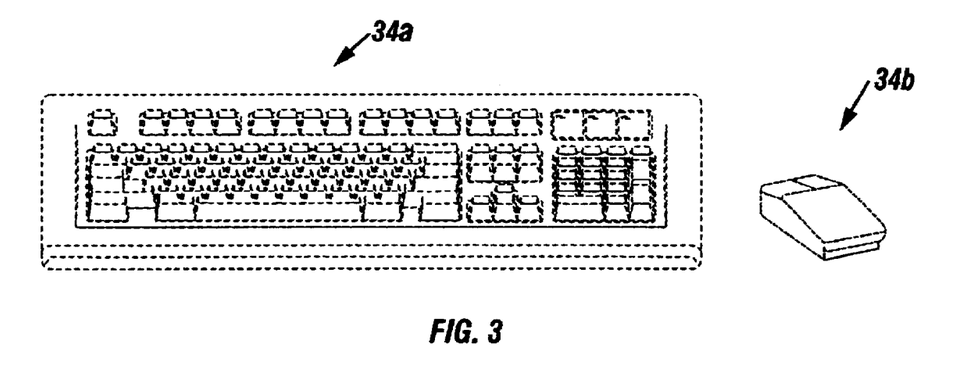
FIG. 3 is a top plan view of the images which may be projected by the device shown in FIG. 1.

In one embodiment in accordance with the invention, one or more input devices, shown in FIG. 3, such as a virtual keyboard 34a and mouse 34b may be projected onto a surface in front of the housing 12. However, the invention is not limited to this illustrated embodiment. When the user positions his or her hands over the image as the user would in using a physical input device, the scanning sensors may capture the movement of the user's hands and convert this movement into input command signals. For example, movements of the user's hand over the surface upon which the mouse image 34b was projected may be converted into pointer position signals for moving the position of the pointer on the display 18. Similarly, typing movements of the user's hands over the surface upon which the keyboard image 34a was projected may cause the corresponding textual input to be entered and to appear on the display 18. Thus, an electromechanical input device may be eliminated.

Alternatively, the scanning sensors may sense the projected light reflected from the user's hands. The scanning sensors may also detect the combination of the reflected, projected light and the user's hands. Also, the projected images may move so as to "follow" the detected movement of the user's hands.

Figure 4:
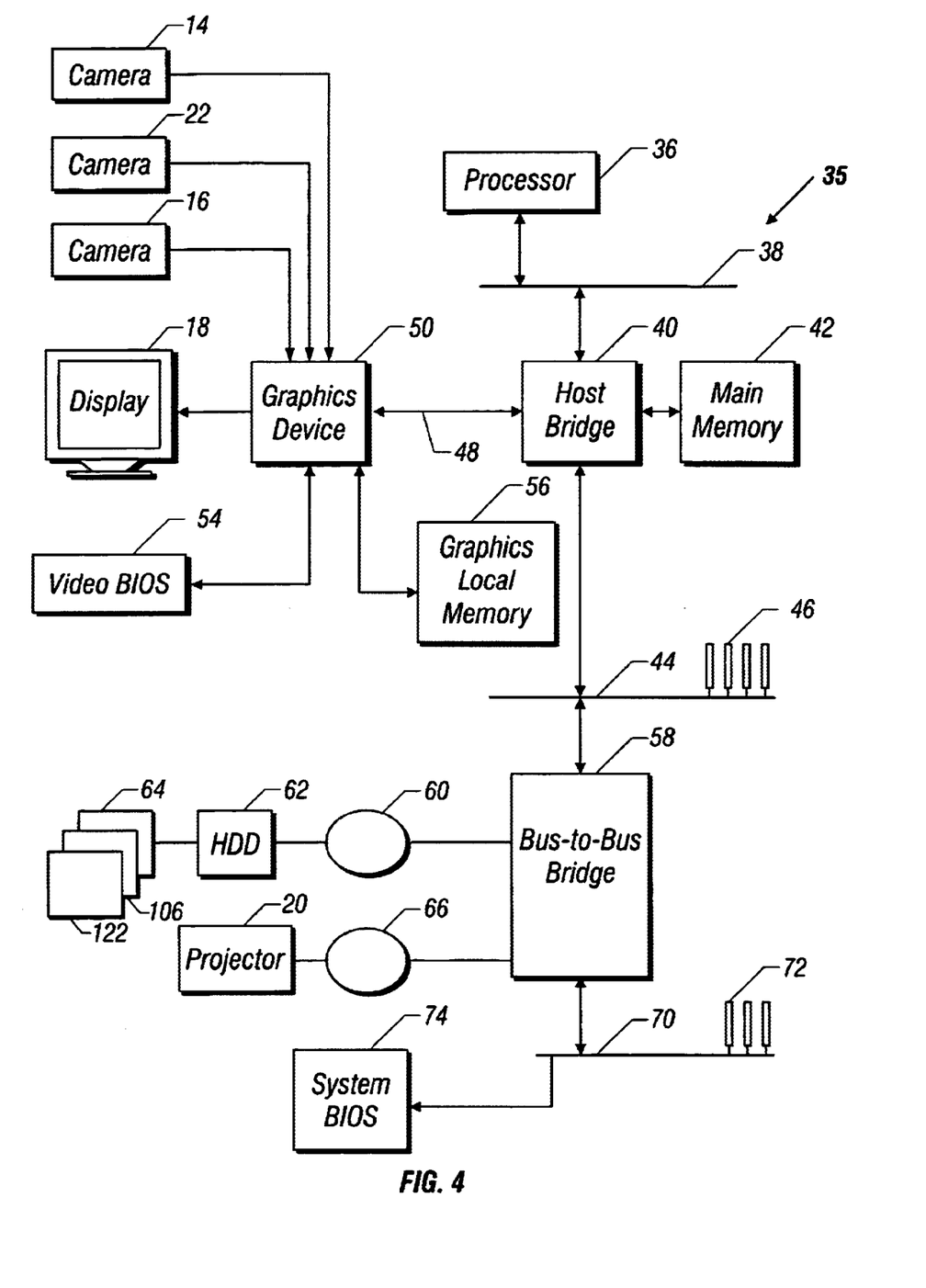
FIG. 4 is a block diagram of one embodiment in accordance with the invention for implementing the device shown in FIG. 1.

Turning now to FIG. 4, an example of a computer system 35 for implementing one embodiment in accordance with the invention may include a processor 36 coupled to a host bus 38. The illustrated computer system 35 includes the 440BX chip set with a Pentium® II processor available from Intel Corporation. The host bus 38 is coupled to a host bridge 40 which in turn couples a main memory 42. The host bridge 40 also couples an accelerated graphic port (AGP) bus 48 (see Accelerated Graphics Port Interface Specification, Revision 1.0, published on Jul. 31, 1996, by Intel Corporation of Santa Clara, Calif.) which couples a graphic device 50. The graphics device 50 may receive inputs from the scanning sensors 14, 16 and 22 and may display the resulting inputs on a display 18 which is also coupled to the graphics device 50. The graphics device 50 may also have a video basic input/output system (BIOS) 54 and a graphics local memory 56.

The host bridge 40 is also coupled to a bus 44 which may include a plurality of slots 46 for receiving peripheral devices. The bus 44 is also coupled to a bus-to-bus bridge 58 which is in turn coupled to an additional bus 70. The bus 70 includes a plurality of slots 72 for receiving additional peripheral devices and the system BIOS 74. The bridge 58 may also couple to a plurality of ports 60 and 66. The port 60 may be coupled, for example, to a hard disk drive 62 which stores one or more programs 64, 106 and 122 as indicated. The port 66 may. be coupled to the projector 20.

While one example of a computer system is shown in FIG. 4, those skilled in the art will appreciate that a number of other systems may be utilized to achieve the objectives set forth herein. Therefore it should be understood that the system illustrated is only an example.

Figure 5:
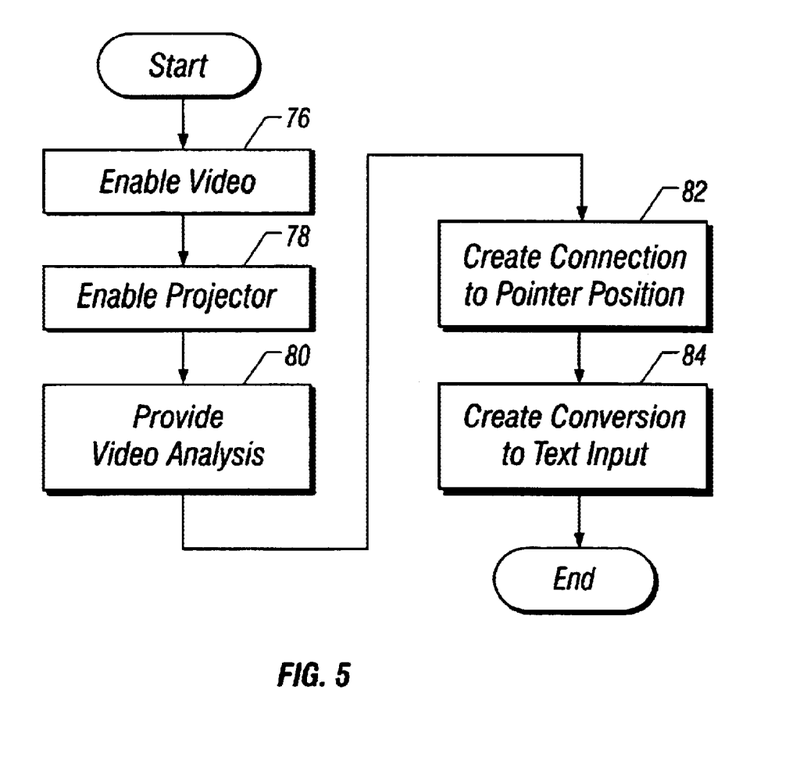
FIG. 5 is a flow diagram of the process of forming a device which can provide the features of the device shown in FIG. 1 in one embodiment in accordance with the invention.

Turning now to FIG. 5, one embodiment of a method for providing the devices having the previously described functionality is illustrated in accordance with the invention. Initially a system is provided with video capability, as indicated in block 76. For example, a computer system may be provided with the ability to process a plurality of streaming video inputs. The system may also be equipped with a plurality of digital cameras. A projector is enabled to project an image of an input device on a surface, as indicated in block 78. The ability to provide video analysis of the resulting movements of the user's hands, for example, may also be provided as indicated in block 80. In accordance with one embodiment, the video analysis may be a conventional pattern recognition software which recognizes the shape of the user's hand and corresponding movements thereof. Next, the ability to convert the user's movements in association with the projected images to a pointer position control signal may be provided, as indicated in block 82. Finally, the ability to convert the movements of the user into text inputs may be provided, as indicated in block 84. In addition, an audible confirmation, such as a key clicking sound may be produced when a keystroke is recognized.

Figure 6:
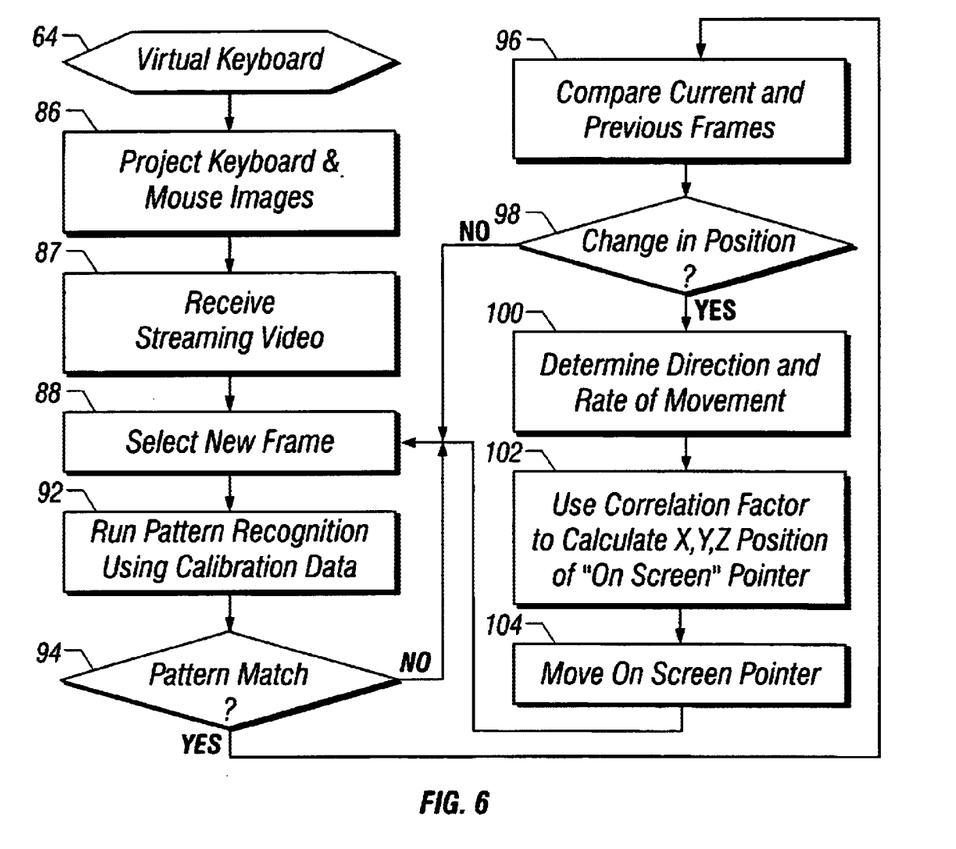
FIG. 6 is a flow diagram for one software implementation of the embodiment shown in FIG. 1.

Turning now to FIG. 6, software 64 may be stored on the hard disk drive 62 in one embodiment according to the invention. Initially the software causes the image of one or more input devices to be projected onto a surface. For example, the image of a keyboard and a mouse may be projected, as indicated in block 86. Thereafter streaming video may be received (block 87) and a particular video frame may be selected, as indicated at block 88. The frame may be selected randomly, or at regular intervals, for example, using a selection technique.

In addition, a scene change detector may be used to determine when there is a significant change in scene. When a significant scene change occurs, a frame may be captured for subsequent analysis. Scene change detectors are known in the art and may involve an analysis of the pattern of intensity signals determined by the pixels that make up an imaging array in one or more cameras. For example, the various pixel sensors may provide output signals. If an output signal is above a certain intensity level, it may be considered white and if it is below a certain level it may be considered to be black. A significant change in the number of white versus black output signals can be recognized as a scene change initiating the selection of one frame from the streaming video.

While the present invention has been described with respect to the use of a single frame for this analysis, a continuing analysis can be done by successively or continually analyzing successive frames. oversampling may be used to insure that movements are detected.

In the embodiment illustrated in FIG. 6, once a frame is selected, as indicated in block 88, conventional pattern recognition software may be utilized to determine if a particular image pattern is represented by the digital video data stream, as indicated in block 92. This software may recognize a particular preprogrammed image such as the position of the user's fingers on a virtual keyboard or the position of the user's hand on top of a virtual mouse. This software may recognize the image by comparing it to a previously recorded depiction or the software may be trained to learn a particular image through cooperation of the computer owner or user, using learning software.

At diamond 94, the software checks to determine whether the selected frame contains a pattern matching a predetermined pattern which corresponds to a particular input command. If not, flow returns to select another frame.

If a pattern match is detected, the first and a subsequent frame are compared as indicated in block 96. Next, a check determines whether the comparison indicates a change in position (diamond 98). If so, the rate and direction of movement of the image may be determined (block 100). The rate and/or direction of movement can be used to provide corresponding command inputs. For example, in connection with the movement of the user's hand in association with the mouse image, the direction and rate of movement can be reflected in corresponding movements of the pointer on the display 18. For example, a correlation factor may be used to calculate the three dimensional position of an "on screen" pointer (block 102). The user inputs may be represented by a signal to the graphics device 50 to move the pointer on the display 18 according to the direction or rate of movement of the user's hand (block 104). The flow cycles back to select a new frame (at block 88) to start the comparison again.

Alternatively, a distinct object may be associated with the user so that the object may be easily recognized. For example, a distinctly colored ring may be used which can be readily detected. Movement of the ring may be detected as a pointer position command.

Figure 7:
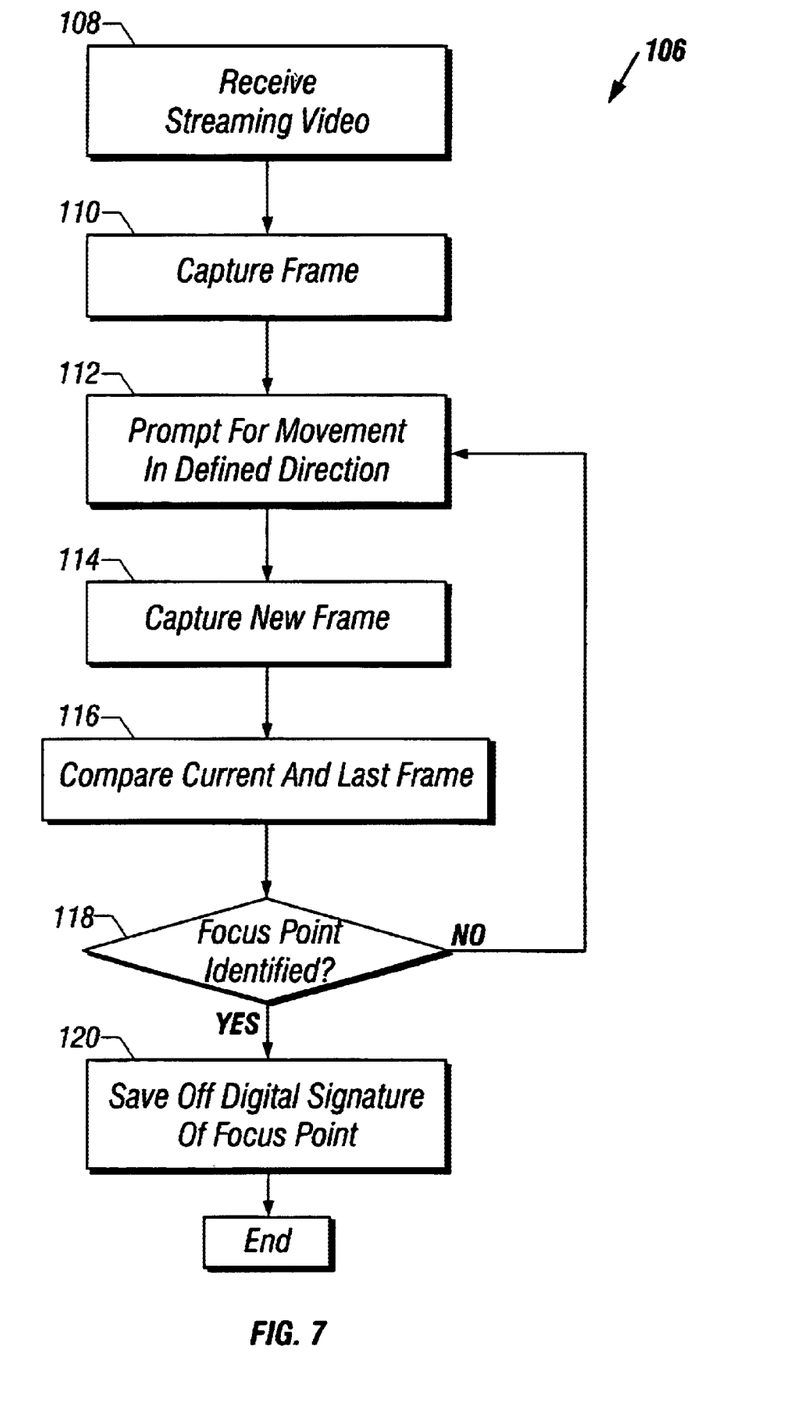
FIGS. 7 and 8 are flow diagrams for calibration software in one embodiment in accordance with the invention.

Software 106 for enabling the system.to calibrate a focus point for pointer position commands is illustrated by FIG. 7. The software 106 may be utilized during a calibration period in order to program the system to recognize the desired inputs. Referring to FIG. 7, initially streaming video is received as indicated in block 108. A frame of that streaming video is captured, as illustrated in block 110.

Next, the system is prompted for movement in a defined direction as shown in block 112. For example, an on screen display may guide the user through the learning process. For example, the on screen display may first direct the user to show a left cursor position command. The sequence then cycles through each of the cursor command directions. Once the system knows what cursor command is being programmed, it may capture a new frame of videoas indicated in block 114. The new frame and the prior frame are compared to determine a difference that amounts to a given cursor command (block 116). A check atdiamond 118 determines whether a focus point has been identified. In other words, the system must be able to differentiate the two frames sufficiently to be able to thereafter recognize those differences as a particular pointer position command. If not, the process is tried again. Otherwise, the system saves off the focus point data of the identified focus point, as indicated in block 120.

Figure 8:
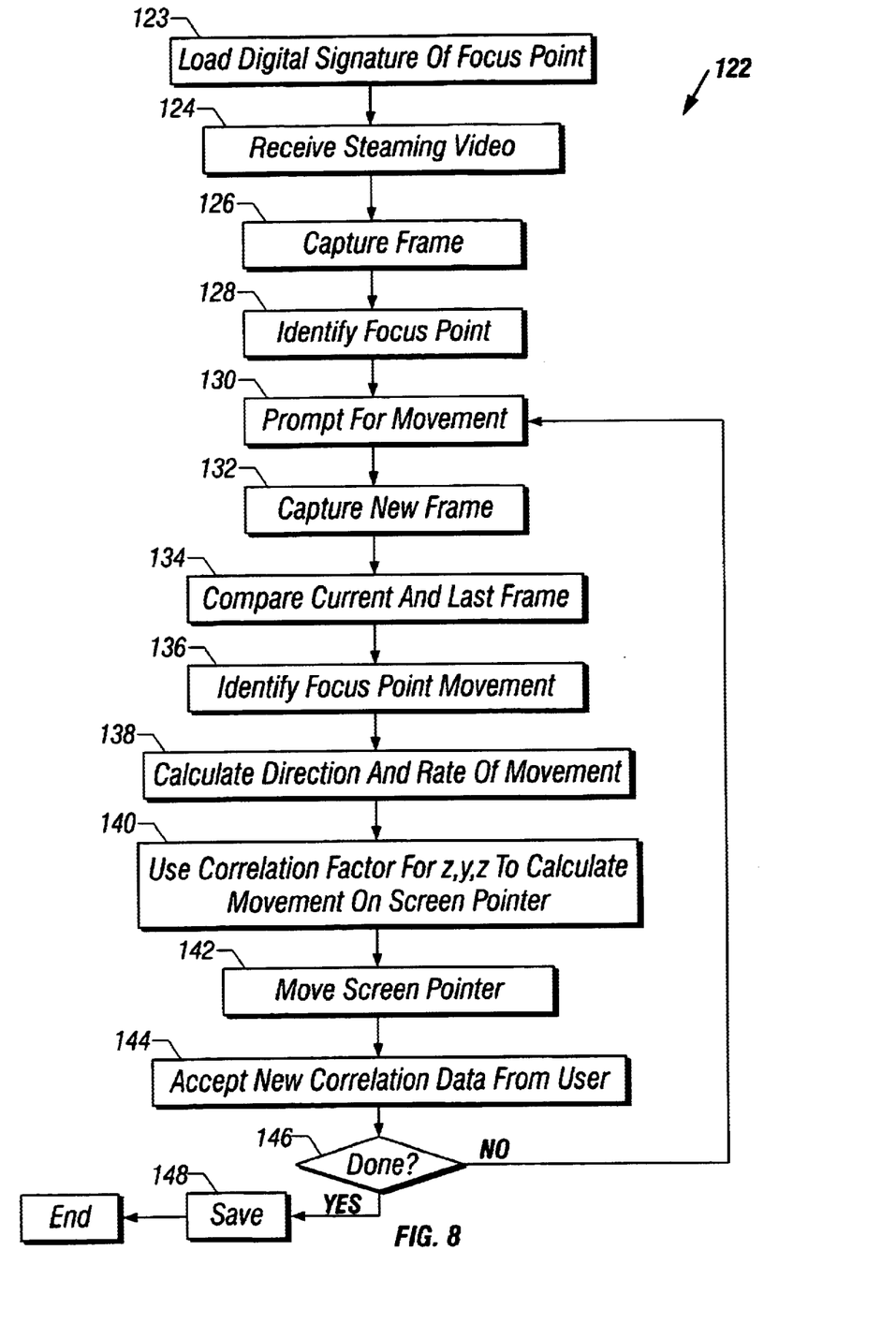

Referring to FIG. 8, the software 122 enables a calibration of speed and direction of pointer position commands. The focus point data determined by the software 106 is loaded at block 123. Streaming video is received as indicated at block 124 and a frame is captured as shown in block 126. A focus point is identified such as the user's finger as indicated in block 128 and a movement prompt is provided (block 130). The prompt may be a message block on the screen asking the user to implement what the user wants to use as a desired movement. A new (subsequent) frame is captured in block 132 and compared to the frame captured in block 126, as illustrated by block 134.

The focus point movement is identified (block 136) and a direction and rate of movement are calculated as indicated in block 138. A correlation factor for x, y and z directions is used to calculate the corresponding rate and direction of movement of the screen pointer (block 140). The screen pointer is then moved as indicated in block 142. The user then may adjust the amount of pointer movement for a given movement of the user's finger, for example through inputs provided by a prompt screen, as indicated in block 144. In addition, the user may provide alternative inputs which could be received as a particular pointer position command. The user is then prompted to indicate whether the user is done in diamond 146. If not, the flow cycles and new commands may be learned as described above. Otherwise the flow is terminated and the information is saved (block 148).

The number of cameras that may be used may be subject to considerable variation. More cameras may result in better three dimensional imaging. This may allow movements in three dimensions to be recognized as input command signals. In addition, camera redundancy may be used to eliminated errors.

While the present invention has been illustrated with respect to separate cameras mounted on a computer, the cameras could be integrated into the housing of the computer system itself. In addition, while the invention has been illustrated in connection with cameras sensitive to light in a visible spectrum, infrared detecting cameras could be used as well.

By using streaming video to control input information, an electromechanical connection (which may be prone to errors or failure) may be eliminated in some embodiments. In addition, the accuracy of the inputs may be improved in some embodiments, for example, as compared to touch pad pointing devices, because the possibility of incorrect actuation due to dirt or moisture may be eliminated.

Other input devices may be handled in the same fashion. For example, a telephone may be replaced with the projected image of a telephone. A computer microphone may be activated when the handset is grasped and lifted as recognized by the scanning sensor system. Dialing could be handled in the same fashion described previously in connection with actuation of the keyboard projected image.

The projected image may be altered to correspond to the aportion of the input device the user sees with his or her hands positioned over a normal input device. This altered image may be produced when the user's hands are detected as being in position over the surface that received the projected image. Moreover, the input device image may itself be modified to reflect the user's interaction with that image. For example, when finger movement corresponds to key depression, the projected image may be altered to suggest that the virtual key has moved.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method for inputting data to an electronic device comprising:

projecting an image of a mouse on a surface; and detecting user movements relative to said mouse image.

2. The method of claim 1 further including capturing a digital video image of the user in association with the projected image and inputting a representation of said image to the electronic device.

3. The method of claim 2 further including analyzing said digital video image including using pattern recognition software.

4. article comprising a medium for storing instructions that, if executed, enable a computer to:

project an image of a mouse on a surface; and detect user movements relative to said image.

5. The article of claim 4 further including instructions that cause a computer to analyze a digital video stream using pattern recognition software.

6. A system comprising:

a processor;

a sensor coupled to said processor;

a projector coupled to said processor; and a memory associated with said processor, said memory storing a computer program that enables a processor to project an image of a mouse using said projector and use said sensor to detect user movement relative to said image of said mouse.

7. The system of claim 6 including a plurality of digital video cameras.

8. The system of claim 6 wherein said system is a computer system.

9. The system of claim 6 wherein said memory includes pattern recognition software.

* * * * *

UNITED STATES PATENT AND TRADEMARK OFFICE
CERTIFICATE OF CORRECTION

PATENT NO. : 6,690,357 B1                                       Page 1 of 1
DATED     : February 10, 2004
INVENTOR(S) : Randy R. Dunton et al.

It is certified that error appears in the above-identified patent and that said Letters Patent is hereby corrected as shown below:

<u>Column 6,</u>
Line 37, delete "detecting user movements relative to said mouse image." and insert:
-- detecting user movements relative to said mouse image;
capturing a digital video image of the user in association with the projected image; and
determining a direction of movement of an object depicted in said digital video
image. --.
Line 44, before "article", insert -- An --.
Line 47, delete "detect user movements relative to said image." and insert:
-- detect user movements relative to said image; and
determine a direction of movement of an object depicted in a digital video stream. --.

Signed and Sealed this

Eighteenth Day of May, 2004

JON W. DUDAS
*Acting Director of the United States Patent and Trademark Office*